(No Model.) 2 Sheets—Sheet 1.

A. DOBSON.
BOLTING REEL.

No. 453,439. Patented June 2, 1891.

Witnesses
J. Edw. Maybee
T. R. Cameron

Inventor
Alexander Dobson
by Donald C. Ridout & Co.
Attys.

(No Model.) 2 Sheets—Sheet 2.

A. DOBSON.
BOLTING REEL.

No. 453,439. Patented June 2, 1891.

Witnesses
J. Edw. Mayhue
W. G. McMillan

Inventor
Alexander Dobson
by Donald C. Ridout & Co.
Attys.

UNITED STATES PATENT OFFICE.

ALEXANDER DOBSON, OF BEAVERTON, CANADA.

BOLTING-REEL.

SPECIFICATION forming part of Letters Patent No. 453,439, dated June 2, 1891.

Application filed August 26, 1890. Serial No. 363,123. (No model.)

*To all whom it may concern:*

Be it known that I, ALEXANDER DOBSON, miller, of the village of Beaverton, in the county of Ontario, in the Province of Ontario, Canada, have invented a certain new and useful Improvement in Bolting-Reels, of which the following is a specification.

The object of the invention is to increase the bolting-surface of a reel without increasing its outer dimensions; and it consists in the peculiar construction, arrangement, and combinations of parts, hereinafter more particularly described, and then definitely claimed.

Figure 1:
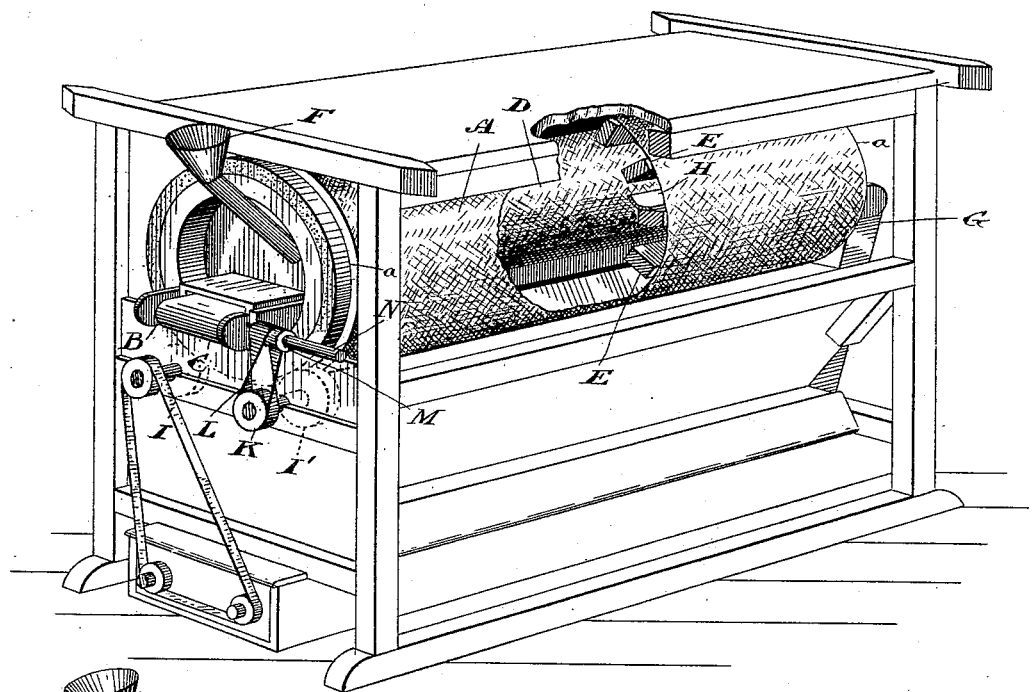
Figure 2:
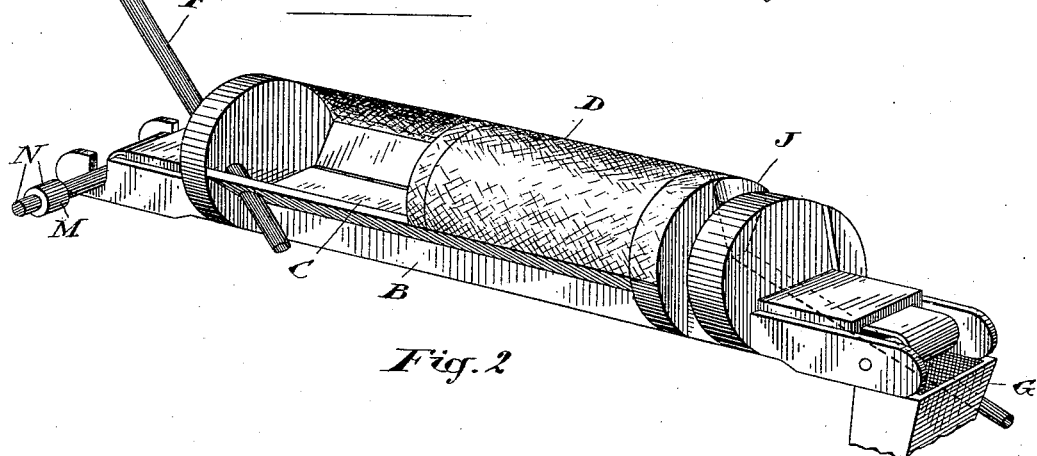
Figure 3:
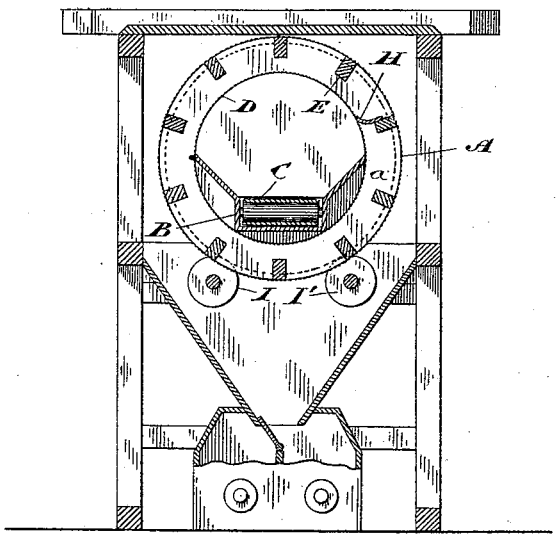
Figure 4:
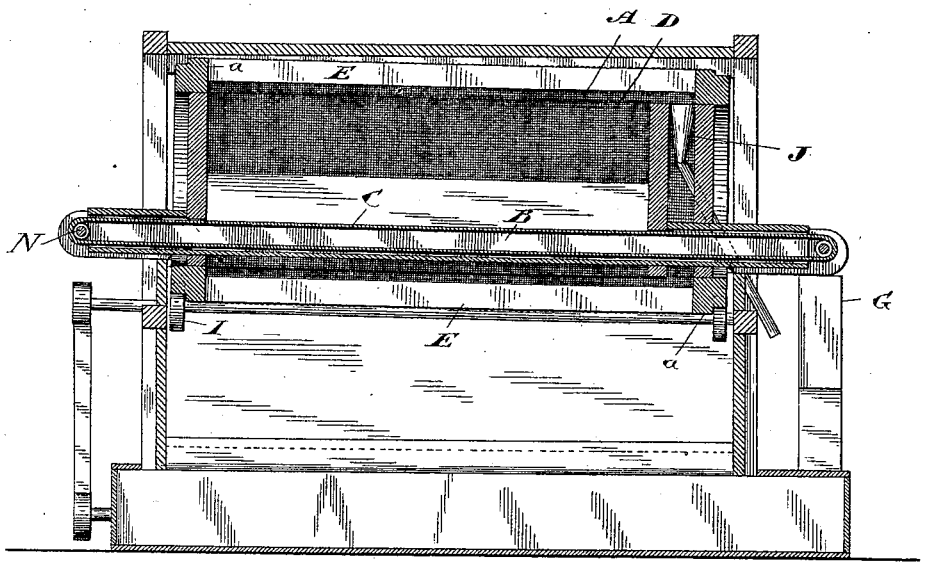

Figure 1 is a perspective view of my improved flour-bolt, a portion of the outer casing being broken away to expose the interior construction involved in the invention. Fig. 2 is a detail of the cloth-covered conveyer used in connection with the revolving bolting-reel. Fig. 3 is a vertical transverse section, and Fig. 4 is a vertical longitudinal section.

In the drawings, A represents the bolting-reel, which is caused to revolve, as usual, in any suitable manner.

B represents the frame of the conveyer, which, as shown in the drawings, consists of an endless belt C, caused to travel longitudinally. The conveyer-frame B is supported, as shown, in the center of the bolting-reel A by resting on the casing of the frame at one end and on a hopper G at the other, and is provided with an arched cover D, made of bolting-cloth. A series of slats E are arranged longitudinally on the inside of the reel A.

F is a spout, through which the flour is fed into the bolting-reel A. When the machine is put in operation the flour will sift, as usual, through the bolting-cloth around the reel A; but as there is of course more flour in the reel than can at once be bolted, the flour in the reel will be elevated by the slats E until the said slats reach such an angle as will cause the flour to fall off onto the arched cover D, through which a portion of the flour will naturally be bolted and fall onto the conveyer C, by which it is conveyed to the end of the frame B and is discharged into the hopper G, which carries it to the bottom of the lower conveyer, where it mixes with the other flour bolted by the reel A. With a view of keeping the cover D clean, I place a brush H, of any suitable material, on the inside of the reel A in such a manner that as the reel revolves the brush will rub against the outer surface of the cover D, and in this way prevent it from being clogged up. From this it will be seen that I not only get the ordinary bolting-surface of the reel A, but I add the bolting-surface of the cover D, thus almost doubling my bolting-surface without increasing the dimensions of the machine.

In addition to the advantage of increased bolting-surface my improved reel requires less power to drive it than the ordinary reel now in use. It will be observed on reference to Fig. 2 that the reel A is caused to revolve by the action of the revolving friction-roller I, and the reel as it revolves gives motion to the friction-wheel I' on a shaft carrying the pulley K, which, by means of the belt L, transmits motion to the pulley M on the shaft N of the conveyer C. The slats E are secured to the ends $a$ of the reel A and are held sufficiently far from the bolting-cloth surrounding the reel not to interfere with the free bolting of the flour through the said cloth. I should perhaps mention that the spout J is for the purpose of conveying the tailings out of the reel A. Owing to the usual slant of the reel A, these tailings gravitate toward the end of the reel A, at which the spout J is located, and they are elevated by the slats E and dropped into the hopper end of the spout J.

What I claim as my invention is—

1. The combination of a revolving bolting-reel, a longitudinally-operating conveyer within the same, and a stationary curved screening-surface between the upper surface of the conveyer and the revolving bolting-reel, substantially as described.

2. The combination of a revolving bolting-reel having elevated ribs, a longitudinally-operating conveyer within the same, and a stationary arch-shaped bolting-cloth between the upper surface of the conveyer and the revolving bolting-reel, substantially as described.

3. The combination of a revolving bolting-reel having a series of elevating-slats on its inner surface, a longitudinally-operating conveyer within the same, a stationary arch-shaped bolting-cloth between the upper surface of the conveyer and the revolving bolt, and a brush attached to the revolving bolting-reel and operating on the stationary bolting-cloth, substantially as described.

Beaverton, July 14, 1890.

ALEXANDER DOBSON.

In presence of—
CHARLES C. BALDWIN,
F. A. WOODWARD.